Figure 1:
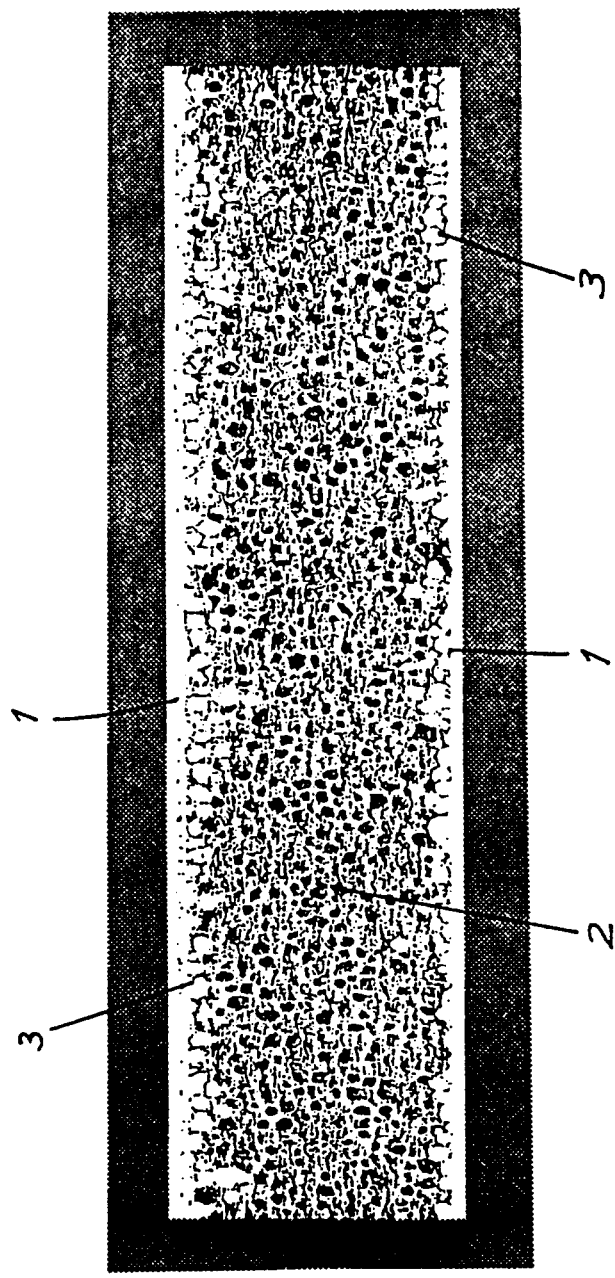

United States Patent [19]

Albertelli

[11] Patent Number: 5,060,291
[45] Date of Patent: Oct. 22, 1991

[54] FOAM COMPOSITE AND METHOD OF FORMING SAME

[75] Inventor: Aldino Albertelli, London, England

[73] Assignee: Company 'A' Foam Limited, Slough, England

[21] Appl. No.: 350,192

[22] Filed: May 10, 1989

[30] Foreign Application Priority Data

May 10, 1988 [GB] United Kingdom ............... 8811033

[51] Int. Cl.⁵ .............................................. B32B 3/26
[52] U.S. Cl. ............................ 428/306.6; 428/308.4; 428/309.9; 428/310.5; 428/319.3
[58] Field of Search .............. 428/306.6, 308.4, 309.9, 428/319.1, 310.5, 319.3, 322.7

[56] References Cited

U.S. PATENT DOCUMENTS

| | | | |
|---|---|---|---|
| 4,254,177 | 3/1981 | Fulmer | 428/308.4 |
| 4,374,172 | 2/1983 | Schwarz et al. | 428/322.7 |
| 4,595,710 | 6/1986 | Albertelli et al. | 428/318.4 |
| 4,843,103 | 6/1989 | Albertelli et al. | 428/318.4 |

FOREIGN PATENT DOCUMENTS

| | | | |
|---|---|---|---|
| 825661 | 10/1969 | Canada | 428/308.4 |
| 0213763 | 11/1987 | European Pat. Off. | |
| 2320783 | 11/1974 | Fed. Rep. of Germany | |
| 1515424 | 1/1968 | France | |
| 611761 | 8/1970 | France | |
| 2427909 | 1/1980 | France | |
| 1297551 | 11/1972 | United Kingdom | |
| 80/01892 | 9/1980 | World Int. Prop. O. | 428/301 |

Primary Examiner—William J. Van Balen
Attorney, Agent, or Firm—Browdy and Neimark

[57] ABSTRACT

Foam laminates wherein the bond between the foam layer and the adjacent layer is enhanced by mechanical keying, which exhibit excellent surface finishes and are suitable in a wide variety of uses are obtained very simply in a single step and without the need for complicated molding equipment or expensive mold materials by a method comprising:

(i) providing a solid body of foamed material comprising foamed synthetic resin with or without a filler, said body containing substantially an open-cell structure and having a face containing pores open to the surface;

(ii) applying to or forming on said face a layer of viscous or pasty settable material;

(iii) applying pressure to the layer to force some of the material to enter into at least some of said pores while in the unset state and simultaneously to mold the external surface of the layer; and thereafter (iv) causing or allowing said settable material to set whereby to form a foam laminate including a layer of set material which is mechanically keyed to said solid body of foamed material.

14 Claims, 1 Drawing Sheet

FOAM COMPOSITE AND METHOD OF FORMING SAME

This invention relates to a novel method of forming foam resin laminates and is particularly suitable for use in the production of laminated panels such as those used in building, in furniture and as architectural mouldings.

Foam resin laminate panels of the kind comprising a foam resin layer and a skin are being employed increasingly in the building, decorating and furniture industries because of the wide range of useful properties that can be achieved by forming the layers from different kinds of materials. For example, the useful strength/weight ratio of a rigid foam core can be combined with the weather-resistant, impact-resistant and/or decorative properties that can be obtained by appropriate choice of materials for the skin. Of particular interest are the foam sandwich panels comprising a layer of foam between two skins, since they can also combine good tensile strength and resistance to compression with low values for deflection under load.

However, problems with the current methods of forming the laminated panels are limiting their wider exploitation.

In one conventional method of forming the panels, the skin or skins and the foam core are formed separately and then bonded together by means of an adhesive or by heat. However, some adhesives fail under certain conditions, leading to delamination, and others are difficult to apply or require the use of carefully controlled conditions e.g. because components in them are considered to be toxic or otherwise a hazard to health. In yet other cases, components in the adhesive adversely affect one or both of the layers to be bonded. e.g. due to a chemical attack or to local solvation of the layer. Likewise, the use of heat for bonding is limited because it is only suitable where at least one of the layers is of heat-softenable material and neither layer is adversely affected by the heat treatment. Further, the bonds obtained with some materials by heat are not strong enough or tend to deteriorate with age.

Moreover such methods are not economic for the production of panels, such as panelled doors or reproduction wall panelling, which have a deeply profiled surface, because they involve separately forming suitably profiled core and skin members and this involves using expensive moulds.

An alternative method which has been proposed for forming laminates in which one of the layers comprises a foamed resin material such as foamed polyurethane comprises coating a surface of a mould cavity with a layer of a gel coat material such as polyester and then filling the mould with foamable plastics material and causing or allowing said material to foam to fill the cavity and cure before or after the setting of the gel coat layer. In this method, however, a skin tends to form on the foam at the interface with the layer and said interface forms a zone of weakness. Attempts have been made to avoid this, e.g. by keeping the layer hot while foaming occurs, but this involves heating the mould, which is expensive, and in any event a skin still tends to form on the foam because the heat in the layer tends to accelerate the cure of the foam at the interface.

Clearly, therefore, there is a need for an alternative method for the production of foam laminate panels which obviates or reduces the disadvantages of the methods described above. Such method must enable the formation of a strong bond between the foam layer and the skin, irrespective of the nature of each, and must be controllable.

The formation of laminates having an outer layer of cured resin such as epoxy or polyester presents particular problems. If attempts are made to bond a pre-formed body to a resin layer in the same step as the formation and curing of the resin layer, e.g. by casting a resin layer against a mold surface and then applying the pre-formed body to the resin layer before the latter is fully cured, air or other gas tends to become trapped between these two layers and inhibits formation of a strong and uniform bond. The higher the pressure applied to the layers in an attempt to remove the air, the greater the compression of the trapped pockets of air and the greater the tendency for the bond to fail when the pressure is released. Many methods have been proposed for resolving this but they require the use of expensive or sophisticated equipment such as vacuum pumps or complex molds whose design requirements impose stringent limitations on the range of moldings that can be produced.

Attempts to reinforce the resin layer with glass fibre exacerbate the above problems and in general the laminates have to be made in two steps, the first comprising the formation of the glass-reinforced resin skin and the second comprising the lamination of the cured skin to the second layer. Moreover, the satisfactory formation of the glass-reinforced resin skin generally requires the use of vacuum to ensure that all the air is removed.

Another problem that is observed with attempts to form a laminate in the same step as forming and curing the resin layer is obtaining a cured resin layer of uniform thickness. Even small variations in thickness tend to show up as imperfections on the surface of the resin layer.

A particular problem where the resin is phenolic is the entrapment of gaseous or vapor by-products during the cure. The tendency of phenolic resin layers to cure first at the inner surface rather than the surface in contact with the mold not only adds to this problem but also interferes with obtaining a good bond.

We have now found a method of forming a foam resin laminate which provides a strong bond between the foam resin layer and a contiguous skin layer, can be employed with a wide range of foams and skin-forming materials and is capable of close control. In the method of the invention, a mechanical key is obtained between the foam resin body and the skin layer and this results in a bond between the layers that is so strong that in many cases the application of a shear force in the plane of the laminate causes failure to occur within the material of one of the layers rather than at the interface.

The invention also resolves the problems referred to above relating to the formation of laminates with an outer layer of cured resin. By means of the invention, strongly bonded laminates having an outer layer of cured resin can be successfully formed in one step even when the resin layer is reinforced with glass fibre. The imperfections associated with problems of non-uniform thickness of the resin layer can be avoided and strongly bonded laminates of excellent surface finish can be obtained without difficulty even using phenolic resins to form the surface layer.

A very important feature of the present invention, however, is its simplicity and versatility.

GB-A-1407147 describes a method of encapsulating a foam containing liquid or gaseous dielectric under pressure, for use in electrical equipment and apparatus.

GB-A-2193909 proposes a method for preventing the disintegration of a body of hydrophilic foam, such as is used as a basis for a floral tribute, by coating a part of the body, e.g. by dipping, spraying or painting, with a semi-liquid material which penetrates the foam body and then solidifies.

According to the present invention, the method of forming a foam laminate comprises:

(i) providing a solid body of foamed material comprising foamed synthetic resin with or without a filler, said body containing substantially an open-cell structure and having a face containing pores open to the surface;

(ii) applying to or forming on said face a layer of viscous or pasty settable material;

(iii) applying pressure to the layer to force some of the material to enter into at least some of said pores while in the unset state and simultaneously to mold the external surface of the layer e.g. by pressing it into contact with a mold surface; and thereafter (iv) causing or allowing said settable material to set whereby to form a foam laminate comprising a layer of set material which is mechanically keyed to said solid body of foamed material.

A preferred embodiment of the process comprises forming a layer of said settable material against a mold surface; while said material is unset, applying to said layer said face of said body of foamed material; pressing said body against said layer; and thereafter causing or allowing said material to set.

The pressure required will depend on the size of the pores and the viscosity of the settable material but in general acceptable results can be achieved at quite moderate pressures, e.g. 100-200 psi or even less. Thus, a particular advantage of the invention is that molded structural panels can be obtained using very simple and cheap molds and uncomplicated molding equipment, e.g. such as is used in molding fibrous plaster and grp, and in a single step.

By means of the invention a strong bond is formed between the layer and the foamed resin body, normal adhesive forces between the materials of the body and the layer being supplemented and reinforced by the mechanical keying of the layer to the body by virtue of material of the layer entering and solidifying by setting within open pores in the face of the body. Moreover, the entrapment of bubbles of air or other gas between the foam body and the layer of settable material is avoided because the gas can escape into the body of foam; any consequential increase in pressure within the foam being very small and evenly distributed. Gaseous by-products, such as are formed during the curing of phenolic resins can be similarly absorbed into the foam body or escape through it. Further where the layer of settable material is not of uniform thickness, excess material in zones that are thicker than desired can be dissipated within the foam body, thereby eliminating surface imperfections that would otherwise occur.

The invention is particularly applicable to the production of panels, especially those of the kind where both faces of the foam core are provided with skins. Preferably, both skins are applied by the method of the invention. Examples of panels that may be formed by the method of the invention are panels for use in building, e.g. wall panels, doors, ceiling tiles and partitioning; panels for use in furniture, e.g. table tops, desk tops, tops for sideboards and dressing tables and like; cupboard and wardrobe doors; panels for use in the construction of the carcasses of cupboards desks, sideboards, bookshelves, wardrobes, dressing tables and the like; work surfaces for kitchens and laboratories; decorative panels and architectural panels, e.g. for use as cornices, architraves and moulded panelling.

The external face of the layer of settable material may be molded against a plane flat surface, e.g. to provide a product having a flat polished skin, or it may be patterned, e.g. to provide a woodgrain effect, and/or profiled. One preferred embodiment of the invention, however, enables the production of profiled panels from flat foam resin slabstock, e.g. of simple rectangular parallelopiped form. In this embodiment, the foam resin body, e.g. slabstock, is formed from foam which is controllably crushable under pressure and sufficient pressure is applied so that the face of the foam body which is in contact with the layer of settable material is crushed to the profile of the mould.

A particularly suitable foam material for use in this embodiment of the invention is rigid foam obtained by causing or allowing a mixture of phenolic resole, acid hardener and finely divided particulate solid to cure under conditions in which foaming of the mixture is caused primarily or solely by volatilisation of small molecules present in the resole or formed as a by-product of the curing reaction. The formation of such foams is described in detail in EP-A-0 010 353 and foamed bodies comprising these foams are obtainable as "ACELL" from Company 'A' Foam Limited of Addison Road, Chesham, Buckinghamshire, England. Preferably, the foam has a density in the range 100 to 500 $kg/m^3$, more preferably 150 to 400 $kg/m^3$ and most preferably 150 to 250 $kg/m^3$. It has been found that the rigid foams can be caused to reproduce on a face thereof the detail of even quite fine and complex mould surfaces by the application of a suitable pressure the level of which depends on the nature and density of the foam material but can readily be determined by simple experiment.

It is essential that the body of foamed material contains a substantially open-cell structure so that as the viscous or pasty material is pressed into the pores, the gas or vapor therein can be readily displaced. While any suitable foam resin material may be employed, the invention is particularly suitable for use with substantially rigid structural foams; that is, self-supporting foams which are resistant to deflection under load and do not collapse under moderate pressure. The physical properties of such foams, especially the compressive strength and deflection under load, are related inter alia to the cell wall thickness. However, increase in that thickness will increase the density of the foam for a given cell size. Thus, in order to obtain a good combination of physical properties and low density, it is generally necessary for the foam to have a relatively large cell size as compared with, for example, foams used for packing, insulation, decorative or other non-structural purposes. In general, the cell size for suitable structural foams will be found to be in the range 0.5 to 5 mm, more preferably 0.5 or 1 mm to 2 or 3 mm.

Foamed phenolic resin reinforced with a finely divided filler is particularly preferred because of the excellent combination of physical properties and fire resistance that is obtainable in laminates formed from it.

A very desirable combination of impact strength, flexural modulus, heat and sound insulation, fire-resistance and rigidity may be obtained in laminates of this invention by the use of the foams described above with reference to EP-A-0 010 353.

In addition to the advantageous combination of properties referred to above, panels formed in accordance with this invention from such foam bodies and appropriate surface layers can also be readily cut and machined using conventional woodworking machinery, and can receive conventional fixings such as nails and screws.

Preferably at least some of the pores of the foamed body that are open to the surface of the face on which the layer is to be formed, open out below the surface to a greater width than the opening, thereby providing an undercut which enhances the keying. However, this is not essential and adequate keying is also obtainable with pores having no such undercut.

The thickness of the layer of settable material provided on the face of the solid body of foamed material will usually be at least 1 mm but thicknesses of less than 1 mm are also contemplated. If desired, the thickness of the layer of material may be reduced before, e.g. by use of a doctor knife, or after setting, e.g. by grinding.

In order to achieve a layer of significant thickness, it will be understood that the viscous or pasty material should preferably be of such a consistency that there is little tendency to flow without an applied superatmospheric pressure. In particular, the viscous or pasty material should not have a consistency such that it is readily absorbed by the foamed body or readily runs off the surface. If desired, the desired thickness may be achieved by application of a plurality of thinner layers.

Although heat-softened thermoplastic resins which set on cooling may be used as settable materials in the process of the invention, most preferred are hydraulic cement compositions and so-called thermosetting resins.

By a hydraulic cement is meant a material which on admixture with water sets to a solid. Gypsum is a particularly preferred example. By a thermosetting resin is meant a resin composition, such as those employed as gel coats and/or in the production of glass fibre reinforced resin materials by lay-up procedures, e.g. polyesters, phenolformaldehyde resoles and novolaks, and epoxies, which cures to a solid material by chemical reaction between two components of the composition. As is now conventional the term "thermosetting" also includes resin compositions which are capable of curing without application of heat.

Examples of preferred viscous or pasty settable materials for the layer include paste-like aqueous gypsum and cement compositions and cold-curing or heat-cured resins such as phenolics, epoxies, amine- and ureaformaldehyde resins, polyesters and polyurethanes.

The layer of the settable material may be reinforced with a filler or fillers such as particulate fillers and/or chopped fibres and/or by a continuous reinforcement such as a woven or non-woven fibrous mat. This continuous reinforcement may be pressed into the layer of viscous or pasty material before the latter sets or alternatively the viscous or pasty material may be caused to pass through and/or impregnate it. A particular advantage of the invention is the ease and simplicity by which foam laminates having surface layers of glass fibre reinforced resin may be obtained using uncomplicated moulds made from inexpensive materials.

Other conventional additives such as heat and light stabilisers, pigments, dyes, lubricants, plasticisers, etc., may also be included in the layer.

One particularly preferred embodiment of the invention is where the settable layer comprises fibre reinforced gypsum plaster, especially where the fibre is glass fibre which may be in in the form of chopped strand or roving or woven or unwoven products such as scrim, mat or tissue, or a combination thereof. While fibre-reinforced gypsum plaster is widely used for panelling of walls and ceilings, especially for decorative mouldings, it has the problem that even in substantial thickness of 6 mm or more its physical properties such as impact resistance, tensile strength and deflection under load are unsatisfactory for many purposes. Efforts to resolve these deficiencies by laminating the fibre reinforced plaster to a support layer have hitherto proved unsuccessful because the plaster swells as it dries, thus imposing strains on the laminate which tend to be relieved by cracking, bowing or delamination of the plaster layer.

The present invention reduces this problem because the increase in volume of the plaster that occurs on setting can be absorbed by expansion of the plaster into the pores of the foam body. At the same time, said expansion enables a strong bond to be formed between the fibre reinforced plaster layer and the foam body as a result of the plaster keying into the pores during its expansion. Best results are obtained where plaster is applied to both sides of a foam sheet.

By means of the invention, sheet products having the benefits of fibre reinforced plaster, and especially the ability of this material to conform to complex mould patterns, and yet having good physical properties, especially impact strength, can be obtained at plaster thickness of 1/16th inch (1.5 mm), or even less, and at overall densities substantially lower than those of conventional fibrous plaster mouldings.

In a particularly important aspect of the invention, panel laminates are provided which may be used as substitutes for plasterboard. Plasterboard is widely used in the construction industry in the formation of walls and ceilings because of its relatively low cost and ease of handling. However, its physical properties and especially its load supporting capability and resistance to impact are poor. Moreover, it does not have a surface which is suitable for normal forms of decoration and it is conventional to finish the exposed surfaces of structures made of plasterboard by applying a layer of plaster before applying paint or wallpaper. This finishing step adds substantially to the overall cost of a wall or ceiling made of plasterboard.

Where the solid foamed material employed in the present invention is a foamed phenolic resin reinforced with finely divided particulate solid and the applied layer is of plaster, optionally with fibre reinforcement, the laminates of the invention may be employed as substitutes for plasterboard. With appropriate choice of mould, a surface finish may be obtained which requires no plastering or other finishing step prior to painting. Further, by appropriate choice of the relative thicknesses of the layer and the foamed sheet and of the density of the foamed sheet, panel laminates may be provided whose density is lower than that of plasterboard, e.g. as little as one half that of plasterboard, but having physical properties, especially of impact strength, tensile strength and deflection under load, which are better than those of plasterboard. Moreover, the panels do not distort when wetted.

Where the products are to be employed as substitutes for plasterboard, particularly good results are obtained when a layer is formed on each face of the foamed sheet from glass fibre reinforced gypsum plaster and the foamed sheet comprises foamed phenolic material reinforced with finely divided particulate solid, the foamed sheet has a density in the range 140 to 500 kg/m$^3$, preferably 160 to 220 Kg/m$^3$ and the weight ratio of particulate solid to phenolic resole in the production of the foam is in the range 0.8:1 to 1.2:1; however other densities and ratios of filler to phenolic resole may also be employed. Especially good results in terms of physical properties and fire resistance are obtained when the filler is selected from talc and hydraulic cements including gypsum plaster.

The laminates may also be worked like wood, sawn and milled, and fastened by conventional cheap fastenings such as nails or screws. Thus, they may readily be jointed e.g. by formation of lap joints or rebates. By choice of a suitable mould surface, the laminates may be produced with a purpose-cast decorative finish which requires no further treatment.

The laminates also exhibit good sound deadening and excellent thermal insulation.

In another particularly preferred embodiment of the invention, the layer comprises gel coat resin, preferably polyester or epoxy. Products having tough durable self-colored finishes can be thereby obtained which require no further treatment.

In yet another preferred embodiment, the layer comprises a curable phenolic resole reinforced with finely divided particulate filler. When such a layer is employed together with the preferred phenolic resin foam reinforced with finely divided filler, strong, tough products of outstanding resistance to fire and spread of flame are obtained.

An application of this method to forming a preferred laminate of the invention will now be described. A mould surface, coated with a suitable release agent if desired, is coated with a suitable settable material, in a viscous or pasty form, to form a layer. The mould surface may be a flat surface, or may be suitably profiled e.g. to provide an architectural moulding and may have a polished or matt finish, as desired.

If desired, reinforcement may be provided by pressing a layer of glass fibre tissue or mat into the layer. The desired thickness of the layer may be achieved, if desired, by applying several layers, using the same or different materials, and with further reinforcement, if desired. Particularly pleasing effects are obtained by applying layers of different colours and then, by use of suitable moulds or by cutting back, exposing parts of the under layer through the top layer to achieve a multi-coloured decorative effect.

While the layer is still viscous or pasty, a sheet or block, preferably of simple rectangular parallelopiped form, of solid foamed material having a face containing pores open to the surface is placed on top, face down, and pressure is applied, e.g. by means of a platen press, to force material of said layer into the open pores of the face and to press the layer against the mold surface. Said layer is then caused or allowed to set. In an alternative procedure, fibre reinforcement may be applied to the mould surface and then a layer of the viscous or pasty material is pressed through the fibre layer to contact the mould surface. In yet another alternative procedure, the layer of fibrous reinforcement is laid on top of the (top) layer of viscous or pasty material which is then pressed through the fibre layer into the pores of the foam sheet when pressure is applied.

If desired one or more layers of settable material may be applied to the mold surface and caused or allowed to set prior to the application of the layer which is contacted with the face of the foam body.

In a further modification of the invention, a sheet or film of facing material may be located against the mold surface prior to the application of the layer of settable material and bonded to said layer to form an outer skin of the laminate.

As indicated above, with suitable choice of foam formulation, the face of the foam sheet in contact with the settable material can be caused to adopt the contours of the mould by application of appropriate pressure.

The process may be made continuous by forming the viscous or pasty layer on a moving band which forms the mould surface, advancing the band with the still unset layer past a station where sheets of the solid foamed material are applied consecutively to the layer as it passes the station, pressing the sheets into the layer, causing or allowing the layer to set and then cutting the product into lengths. Alternatively, individual moulds may be advanced past a first station where the layer is formed and a second station where the sheet of solid foamed material is applied.

Where the settable material is heat-softened thermoplastic resin, the method of the invention may be effected by pressing the thermoplastic material, provided in the form of a layer on the face of the body of foamed material, into the surface of the face while in the heat-softened state and thereafter cooling it, or allowing it to cool, and set by resolidification. The layer may be provided by applying the thermoplastic material in particulate form or in the form of a preformed sheet or foil. The thermoplastic material (particles or sheet or foil) may be brought to the heat-softened state before or after its application to the face of the body of foamed material.

Examples of thermoplastic resins that may be employed include acrylics, e.g. methyl methacrylate polymers; vinyl resins e.g. vinyl chloride polymers and copolymers, chlorinated derivatives thereof and UPVC; polyolefins e.g. polymers and copolymers of ethylene, propylene and 4-methylpentene-1; styrenic resins e.g. polymers of styrene; polycondensates e.g. polyesters, polyamides, polycarbonates and polysulphones; rubbery materials e.g. EP rubbers, EPT rubbers, ABS rubbers and styrene/butadiene copolymers; and polymer alloys and blends. The thermoplastic resin may include additives such as heat and light stabilisers, plasticiers, antioxidants, fillers, pigments, dyes and other colorants.

By careful choice of the foam material and the thermoplastic material, valuable laminates can be obtained with a wide range of properties and surface finishes.

While not absolutely essential, it has been found desirable, where the foamed body is a sheet and the panel laminate is likely to be exposed to variations in temperature and/or humidity, to form the layer or layers of material on both of the opposed faces of the sheet. To avoid the possibility of the panel warping due to an asymmetrical nature, it is preferred for the composition, structure and thickness of the layer structure on each side of the foamed sheet to be identical so that a symmetrical laminate is obtained.

More complex laminates may also be made, e.g. of the structure ABCBA, CABA, CABAC or ABBA where A represents at least one layer formed from settable material, B represents a foamed sheet and C represents at least one other layer, e.g. of plastics, metal, wood or wood product. Laminates of the structure ABABA may be produced by forming two laminates each having layers on opposed faces of a sheet of solid foamed material and bringing the two laminates together while the material of at least one and preferably both, of the two layers that are brought into contact with each other is still unset and then causing or allowing said material to set.

The laminates of the invention may be used, for example, for forming the interior envelope of a building or room, cladding, partitioning, ceiling tiles, furniture and architectural mouldings.

The invention is now illustrated but in no way limited by the following Examples.

EXAMPLE 1

A coffered ceiling panel suitable for use as a substitute for a conventional fibrous plaster molding was manufactured in the following manner.

A mold of desired shape, pattern and profile was coated with tallow or other suitable mold-release agent. The mold was made of shellac-coated plaster but other suitable materials may be used, e.g. grp, rubber or even plywood.

A slurry was then prepared in conventional manner from fine casting plaster and applied to the mold. While the slurry was still liquid, a 1200 mm × 600 mm × 30 mm rectangular slab of ACELL (Registered Trade Mark) foam having pores of an average size of 1.5 to 2 mm was pressed into it with sufficient pressure to cause some of the slurry to enter surface pores of the foam slab. The slurry was allowed to set and then the laminate was released from the mold.

The plaster face of the product showed excellent reproduction of the mold contours and was strongly keyed to the foam. Delamination was not possible without damaging the plaster face. The finish was so good that it was ready for painting without further treatment.

A variety of moldings having a range of surface textures and with raised or sunken panels was obtained by this method.

EXAMPLE 2

The method of Example 1 was repeated except the layer of slurry was built up by applying a plurality of thinner layers and laying down a glass fibre mat between each layer. Pressing the foam slab on caused excellent consolidation of the layers of fibre with the slurry.

EXAMPLE 3

A molded panel suitable for internal partitioning in a building was manufactured as follows.

Two rectangular molds for the production of a 2400 mm × 1200 mm panel and having the desired pattern and profile for the two faces of the panel were each coated with mold-release agent No. 1. The molds were formed from grp but other materials such as metal and plywood may also be used.

A phenolic resole mixture containing finely divided filler and catalyst was prepared and spread over each mold surface to a predetermined thickness and allowed to cure.

Glass fibre mat was then laid over the cured resin in one of the molds and a second layer of phenolic mixture was applied over the mat. While this second layer was still fluid, a 2400 mm × 1200 mm × 50 mm rectangular slab of ACELL was located on top of the layer. A further layer of the phenolic mixture was then applied to the top face of the slab followed by a layer of the glass fibre mat. The second mold, with its cured layer of phenolic resin in place, was inverted and placed on top of the mat and pressure was applied by means of a platen press to cause the layers of fluid phenolic resole mixture to permeate the glass fibre layers and to enter into the surface pores of the ACELL slab. When these layers had set, the pressure was released and the product removed from the molds.

The product showed excellent reproduction of the mold surface, had a good surface finish requiring no further treatment and exhibited excellent resistance to fire and spread of flame. The layers of the laminate were strongly bonded together and delamination was not possible without damaging one of the layers.

EXAMPLE 4

A molding suitable for use as an external door was obtained using the general procedure described in Example 3 but employing cold-curing polyester resin in place of the phenolic resole.

The molds employed were of a size, shape and profile to provide the facings of a Georgian style panelled front door 2 m × 1 m in size. The two molds were made from grp but other materials such as metal or plywood may also be used. For the first layer applied to each mold, a catalysed self-colored mix of cold-curing polyester resin was employed. The second layers, however, did not include colorant.

EXAMPLE 5

A 2400 mm × 1200 mm panel suitable for use as a substitute for plasterboard was obtained as follows using a pair of molds each with a flat polished face.

The molds were coated with tallow or other suitable mold release agent and then coated to a thickness of about 3 mm with a slurry of fine casting plaster. A layer of open weave woven glass fibre of the kind used for grp lay-up was then applied to the coating in one of the molds while the latter was still wet and a 2400 mm × 1200 mm × 10 mm rectangular slab of ACELL foam with a density of 250 kg/m$^3$ and an average pore size of 1.5 mm to 2 mm in diameter was placed on top. A further layer of the glass fibre was applied to the top surface of the slab and then the second mold with its slurry coating was inverted and laid on top of the whole assembly. Pressure was then applied by means of a platen press to force some of the slurry into the surface pores of the foam and consolidate the glass fibre and slurry.

After the layers of plaster slurry had set, the product was removed from the mold.

A typical cross-section of a laminate of the kind made by the process described in this Example is shown in FIG. 1, which uses a dark background in order to make the structure easier to see. In FIG. 1, 1 is a glass-reinforced plaster layer and 2 is the foam slab. The presence of the plaster within the pores of the foam adjacent to each face is clearly visible at 3 from which it can be seen that the degree of penetration varies along the surface of the foam and at some locations the penetration is significantly deeper than in others and the depth of penetration over the face of the panel is random.

Attempts to delaminate a 50 mm×50 mm sample by applying a parting force to the faces in a direction normal to the planes of the layers and by attempting to peel a plaster layer from the foam slab caused failure of the plaster layer or of the foam slab before delamination occurred.

I claim:

1. A panel comprising (i) a solid body core of substantially rigid structural, substantially open-celled foamed phenolic resin containing finely divided filler and having an average cell size in the range of 0.5 to 5 mm, said body core having first and second opposed faces each containing pores open to the surface, and (ii) a layer bonded to each of said first and second opposed faces, each said layer (ii) comprising hardened composition of a settable viscous or pasty material selected from the group consisting of aqueous gypsum plaster compositions and thermosetting resin compositions in contact with said face with some of the hardened material penetrated within said pores forming a mechanical key between said layer and the foamed body, at least one of said layers (ii) containing fibre reinforcement.

2. A panel as claimed in claim 1 wherein at least one of said layers (ii) is formed against a mold surface to mold the external surface of the layer.

3. A panel comprising (i) a solid body of substantially rigid structural foamed material comprising a substantially open-celled foamed phenolic resin containing finely divided filler and having an average cell size in the range of 0.5 to 5 mm, said solid body having a face containing pores open to the surface and, bonded to said face, (ii) a layer which contains fibre reinforcement and is formed by setting a settable viscous or pasty material selected from aqueous gypsum plaster compositions and thermosetting resin compositions in contact with said face with some of the set material lying within said pores whereby there is a mechanical key between said layer and the foamed body.

4. A panel as claimed in claim 3 wherein said layer (ii) is formed against a mold surface to mold the external surface of the layer.

5. A panel as claimed in claim 3 which is a laminate comprising two said layers bonded to the one and the other, respectively, of opposed faces of a core comprising a sheet of said foamed material each of which faces contains pores open to the surface, some of the material of each said layer lying within the pores whereby there is a mechanical key between each said layer and said core.

6. A panel as claimed in claim 5 wherein one or both of the layers comprises gypsum plaster.

7. A panel as claimed in claim 5 wherein one or both of said layers comprises gel coat resin.

8. A panel as claimed in claim 5 wherein one or both of said layers is derived from a curable composition comprising phenolic resin and finely divided filler.

9. A panel as claimed in claim 3, wherein said foamed body has a cell size in the range of 1 mm–3 mm.

10. A panel as claimed in claim 5, wherein one or both of said layers has a thickness of about 1.0–1.5 mm.

11. A panel as claimed in claim 6, wherein said gypsum plaster is glass fiber-reinforced.

12. A panel according to claim 11, wherein said foamed body has a density of 160–220 kg/m$^3$ and a weight ratio of particulate solid to phenolic resin in the range of 0.8–1.2:1.

13. A panel as claimed in claim 3 in which said solid body of substantially rigid structural foam material comprises a reaction product of a mixture of phenolic resole, acid hardener and said finely divided filler cured under conditions in which foaming of the mixture is effected substantially by volatilization of small molecules present in the resole or formed as a by-product of the curing reaction.

14. A panel according to claim 3, wherein said finally divided filler of said solid foamed body is selected from the group consisting of talc and hydraulic cements, and
   wherein the degree of penetration of said settable material within said pores varies along the surface of the foam whereby the penetration is significantly deeper in some location than in other locations and the depths of penetration over the face of the panel is random.

* * * * *